US007169844B2

United States Patent
Inokami

(10) Patent No.: US 7,169,844 B2
(45) Date of Patent: Jan. 30, 2007

(54) RESIN WITH FUNCTION OF OXIDATION INHIBITION AND EMULSION THEREOF

(75) Inventor: Kiyotaka Inokami, Takasago (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/502,227

(22) PCT Filed: Jan. 21, 2003

(86) PCT No.: PCT/JP03/00491

§ 371 (c)(1),
(2), (4) Date: Jul. 22, 2004

(87) PCT Pub. No.: WO03/062295

PCT Pub. Date: Jul. 31, 2003

(65) Prior Publication Data

US 2005/0121652 A1    Jun. 9, 2005

(30) Foreign Application Priority Data

Jan. 23, 2002    (JP)    ............... 2002-014893

(51) Int. Cl.
C08J 3/00    (2006.01)
C08K 3/20    (2006.01)
C08L 75/00   (2006.01)
C08G 18/00   (2006.01)
C08G 61/02   (2006.01)

(52) U.S. Cl. ............... 524/591; 524/839; 524/840; 524/589; 524/590; 528/44; 528/65; 528/66; 528/76; 528/77; 528/79; 528/86

(58) Field of Classification Search ............... 524/591, 524/839, 840, 589, 590; 528/44, 65, 85, 528/66, 76, 77, 79, 86

See application file for complete search history.

(56) References Cited

U.S. PATENT DOCUMENTS

| 3,536,663 | A | * | 10/1970 | Oertel et al. | ............ 528/85 |
| 3,923,713 | A | | 12/1975 | Hermann | |
| 4,203,889 | A | | 5/1980 | Chang et al. | |
| 4,578,410 | A | | 3/1986 | Takahashi et al. | |
| 4,831,109 | A | | 5/1989 | Mitra et al. | |
| 5,173,300 | A | * | 12/1992 | Burleigh et al. | ............ 424/445 |
| 5,541,251 | A | * | 7/1996 | Bontinck et al. | ............ 524/507 |

FOREIGN PATENT DOCUMENTS

| JP | 50-16381 B2 | 6/1975 |
| JP | 62-109813 A | 5/1987 |
| JP | 463835 A2 | 1/1992 |
| JP | 9-40737 A | 2/1997 |
| JP | 10-025325 A | 1/1998 |
| JP | 10-110094 A | 4/1998 |
| JP | 11-92655 A | 4/1999 |
| JP | 2000-169701 A | 6/2000 |
| JP | 2001-019711 A | 1/2001 |
| JP | 2002-187344 A | 7/2002 |

* cited by examiner

*Primary Examiner*—Patrick D. Niland
(74) *Attorney, Agent, or Firm*—Birch, Stewart, Kolasch & Birch, LLP

(57) ABSTRACT

An emulsion of resin having a function of oxidation inhibition obtained by subjecting an antioxidant (A) having two or more alcoholic hydroxy groups, a polyol compounds (B) as an optical ingredient, a compound (C) having a carboxy group and an active-hydrogen group, and an organic polyisocyanate (D) to urethanation reaction in an organic solvent, neutralizing the resultant resin solution with a neutralizing agent (E), and then dispersing the solution in water. A resin having the function of oxidation inhibition is obtained from the emulsion.

7 Claims, No Drawings

RESIN WITH FUNCTION OF OXIDATION INHIBITION AND EMULSION THEREOF

TECHNICAL FIELD

The present invention relates to a resin having a function of oxidation inhibition, an emulsion of the resin having the function of oxidation inhibition, an aqueous emulsion of the resin having the function of oxidation inhibition, a resin emulsion composition containing the emulsion of the resin having the function of oxidation inhibition, and a resin aqueous emulsion composition containing the aqueous emulsion of the resin having the function of oxidation inhibition. The resins obtained from the resin emulsion composition and the resin aqueous emulsion composition have excellent light resistance and excellent chemical resistance.

BACKGROUND ART

In recent years, in consideration of the environment, synthetic resin emulsions used in a wide variety of industrial fields including, for example, automobiles, electrical and electronics, and architecture are converted into aqueous compositions. The resins obtained from such resin aqueous emulsions have a defect in that, when exposed to light containing ultraviolet rays such as sunlight or heat, they undergo deterioration or discoloration due to the ultraviolet rays or heat, thus causing a decrease in molecular weight which in turn causes a decrease in strength.

To improve the durability (light resistance) of the resin against ultraviolet rays or heat, an antioxidant is usually added to a resin aqueous emulsion (see, for example, JP 7-138522 A, etc.) Examples of the known antioxidant include 2,6-di-t-butyl-4-methylphenol, 1,3,5-trimethyl-2,4,6-tris-(3,5-di-t-butyl-4-hydroxybenzyl)-benzene, n-octadecyl-3-(3',5'-dibutyl-4'-hydroxyphenyl) propionate.

However, those conventional antioxidants are powdery and have poor affinity for the resin and water in the emulsion, so that addition of them to aqueous emulsions of resins causes various disadvantages. For example, the antioxidants are poor in dispersibility, which results in sedimentation of the antioxidants with lapse of time. This decreases the homogeneity of the resin aqueous emulsion and the mechanical strength of a coating or film formed therefrom.

To eliminate the defect as mentioned above, isooctyl-3-(3,5-di-t-butyl-4-hydroxyphenyl) propionate, which is a liquidized preparation of the above-mentioned antioxidant, has been proposed. Use of this can considerably improve the dispersibility in the resin aqueous emulsion. However, even so, the emulsification and dispersion requires a large amount of an emulsifier, and it can be easily expected that this will give an adverse influence on the water resistance of the resultant coating. Also, there is a concern about bleeding out of the antioxidant with lapse of time.

An object of the present invention is to provide a resin emulsion having the function of oxidation inhibition and a resin aqueous emulsion having the function of oxidation inhibition which have the following properties: they exhibit excellent dispersibility when added to an emulsion of another resin or an aqueous emulsion of another resin; they improve dispersion stability of the emulsion or aqueous emulsion of another resin; in a resin obtained through addition of them; the resin having the function of oxidation inhibition does not deteriorate desirable properties of the other resin; they impart the other resin with excellent light resistance; they involve little bleeding out of the resin having the function of oxidation inhibition on the surface of the coating made of the resin obtained after the addition; and they impart the resin obtained after the addition with prolonged stable light resistance and further impart the other resin with excellent alkali resistance and solvent resistance when the other resin has poor alkali resistance and poor solvent resistance. Another object of the present invention is to provide a resin emulsion and a resin aqueous emulsion obtained by adding, to an emulsion of another resin and an aqueous emulsion of another resin, the resin emulsion having the function of oxidation inhibition and the resin aqueous emulsion having the function of oxidation inhibition, respectively. Another object of the present invention is to provide a resin having the function of oxidation inhibition.

DISCLOSURE OF THE INVENTION

The inventors of the present invention made extensive studies with a view to attain the above objects, and as a result they have found that emulsions or aqueous emulsions of polymers obtained using specified known antioxidants as starting materials have excellent dispersibility in emulsions of other resins or aqueous emulsions of other resins and impart the other resins with excellent light resistance and excellent alkali resistance, thereby achieving the present invention.

That is, according to a first aspect of the present invention, there is provided an emulsion of a resin having a function of oxidation inhibition obtained by subjecting an antioxidant (A) having two or more alcoholic hydroxyl groups, an optional polyol compound (B), a compound (C) having a carboxyl group and an active hydrogen group, and an organic polyisocyanate (D) to urethanation reaction in an organic solvent to obtain a resin solution, neutralizing the resin solution with a neutralizing agent (E), and then dispersing the resin solution in water.

According to a second aspect of the present invention, there is provided the emulsion of the resin having the function of oxidation inhibition according to the first aspect of the invention, wherein the antioxidant (A) having two or more alcoholic hydroxyl groups is represented by general formula (1)

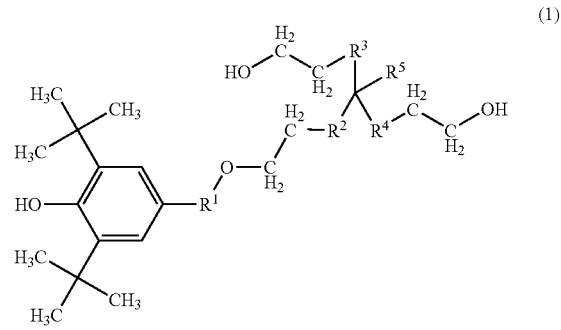

(1)

(wherein $R^1$ is an alkylene group having 1 to 10 carbon atoms and/or $-(CH_2-CO)_m-$, $R^2$, $R^3$, and $R^4$ each are an alkylene group having 1 to 10 carbon atoms and/or $-(CH_2-O)_n-$, $R^5$ is an alkyl group having 1 to 10 carbon atoms or a hydrogen atom, and m and n each are an integer of 1 to 10.)

According to a third aspect of the present invention, there is provided the emulsion of the resin having the function of oxidation inhibition according to the first or the second aspects of the invention, wherein a structural unit of the antioxidant (A) having two or more alcoholic hydroxyl groups is contained in a resin in an amount of 10% by weight or more.

According to a fourth aspect of the present invention, there is provided the emulsion of the resin having the function of oxidation inhibition according to any one of the first to third aspects of the invention, wherein the compound (C) having a carboxyl group and an active hydrogen group is at least one selected from the group consisting of dimethylolpropionic acid, dimethylolbutanoic acid, a reaction product between polyamine and acid anhydride, and a lactone adduct obtained by using dimethylolpropionic acid or dimethylolbutanoic acid as an initiator.

According to a fifth aspect of the present invention, there is provided a resin emulsion composition comprising another resin emulsion, the emulsion of the resin having the function of oxidation inhibition according to any one of the first to fourth aspects of the invention.

According to a sixth aspect of the present invention, there is provided an aqueous emulsion of a resin having a function of oxidation inhibition obtained by removing the organic solvent from the emulsion of the resin having the function of oxidation inhibition according to any one of the first to fourth aspects of the invention.

According to a seventh aspect of the present invention, there is provided a resin aqueous emulsion composition comprising an aqueous emulsion of another resin and the aqueous emulsion of the resin having the function of oxidation inhibition according to the sixth aspect of the invention.

According to an eighth aspect of the present invention, there is provided an resin having a function of oxidation inhibition obtained by subjecting an antioxidant (A) having two or more alcoholic hydroxyl groups, an optional polyol compound (B), a compound (C) having a carboxyl group and an active hydrogen group, and an organic polyisocyanate (D) to urethanation reaction.

According to a ninth aspect of the present invention, there is provided the resin having the function of oxidation inhibition according to the eighth aspect of the present invention, wherein the antioxidant (A) having two or more alcoholic hydroxyl groups is represented by general formula (1)

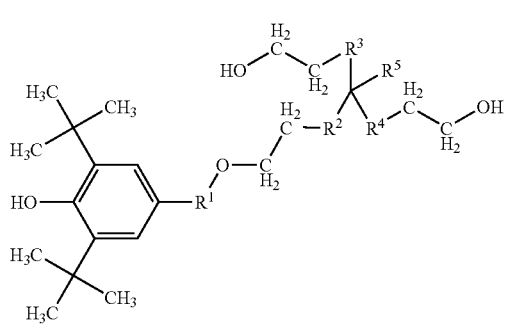

(1)

(wherein $R^1$ is an alkylene group having 1 to 10 carbon atoms and/or —$(CH_2$—$CO)_m$—, $R^2$, $R^3$, and $R^4$ each are an alkylene group having 1 to 10 carbon atoms and/or —$(CH_2$—$O)_n$—, $R^5$ is an alkyl group having 1 to 10 carbon atoms or a hydrogen atom, m and n each are an integer of 1 to 10.)

BEST MODE FOR CARRYING OUT THE INVENTION

Hereinafter, embodiments of the present invention will be described.

Antioxidant (A) having Two or More Alcoholic Hydroxyl Groups

According to the present invention, examples of an antioxidant (A) (component (A)) having two or more alcoholic hydroxyl groups include an antioxidant that performs itself as an antioxidant, has two or more hydroxyl groups which can contribute in an urethanation reaction, and is represented by the above general formula (1). In the general formula (1), examples of an alkylene group having 1 to 10 carbon atoms (C number) represented by $R^1$, $R^2$, $R^3$, and $R^4$ include methylene, ethylene, propylene, trimethylene, tetramethylene, pentamethylene, hexamethylene, heptamethylene, octamethylene, and decamethylene. Examples of an alkyl group having 1 to 10 carbon atoms (C number) represented by $R^5$ include methyl, ethyl, propyl, isopropyl, butyl, sec-butyl, tert-butyl, isobutyl, amyl, tert-amyl, hexyl, 1-ethylpentyl, heptyl, isoheptyl, tert-heptyl, 1-ethylheptyl, octyl, nonyl, isononyl, and decyl. The antioxidant represented by the general formula (1) is preferably a compound represented by the following formula (2) for easy handling and availability.

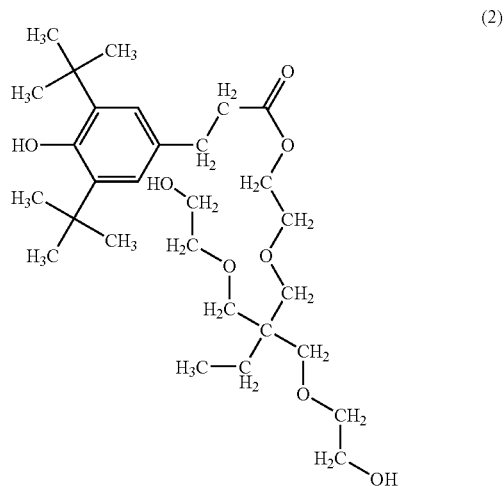

(2)

This compound is available as CHINOX528 (manufactured by CHITEC CHEMICALS).

Polyol Compound (B)

In the urethanation reaction according to the present invention, a polyol compound (B) (component (B)) can be optionally used as an optional component. Examples of the compound (B) include polyester polyols, polyether polyols, polycarbonate polyols, poly(meth)acryl polyols, polyalkyl polyols, and polyalkylene polyols. The polyol compounds are used alone or in combination of two or more of them. The compound (B) is used in amounts of preferably 0 to 200 parts by weight, more preferably 0 to 100 parts by weight per 100 parts by weight of the component (A). The compound (B) is used particularly when elasticity is required for the film.

Compound (C) Containing a Carboxyl Group and an Active Hydrogen Group

Further, examples of the compound (C) (component (C)) containing a carboxyl group and an active hydrogen group, which is one of the reactants of the urethanation reaction according to the present invention, include dimethylolpropionic acid, dimethylolbutanoic acid, reaction products between polyamines and acid anhydrides, and lactone adducts obtained by using dimethylolpropionic acid or dimethylolbutanoic acid as an initiator. The compound (C) is used in amounts of preferably 1 to 15 parts by weight, more preferably 3 to 10 parts by weight per 100 parts by weight of the component (A). If the amount of the compound (C) is less than 1 part by weight, dispersion stability of water dispersion may sometimes be decreased. On the contrary, if the amount of the compound (C) exceeds 15 parts by weight, the water resistance of the resultant film may sometimes be decreased. Thus, neither of the above-mentioned amounts are desirable.

Organic Polyisocyanate (D)

Examples of organic polyisocyanate (D) (component (D)) used in the present invention include: aromatic diisocyanate such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, diphenyldimethylmethane diisocyanate, dibenzyl diisocyanate, naphthylene diisocyanate, phenylene diisocyanate, xylene diisocyanate, and tetramethylxylylene diisocyanate; aliphatic diisocyanate such as tetramethylene diisocyanate, hexamethylene diisocyanate, lysine diisocyanate, 2-methylpentane-1,5-diisocyanate, 3-methylpentane-1,5-diisocyanate, and 2,2,4-trimethylhexamethylene-1,6-diisocyanate; and alicyclic diisocyanate such as isophorone diisocyanate (IPDI), cyclohexyl diisocyanate, hydrogenated xylylene diisocyanate, hydrogenated diphenylmethane diisocyanate, and hydrogenated trimethylxylylene diisocyanate. The organic polyisocyanates are used alone or in combination of two or more of them. Further, modified products of the organic polyisocyanates can be used, and examples thereof include adduct-modified products, carbodiimide-modified products, allophanate-modified products, biuret-modified products, urethodione-modified products, urethoimine-modified products, and isocyanurate-modified products. Preferable examples of the polyisocyanates include hexamethylene diisocyanate, isophorone diisocyanate, hydrogenated xylylene diisocyanate, and hydrogenated diphenylmethane diisocyanate, considering light resistance of urethane to be obtained.

The amount of the organic polyisocyanate (D) to be used preferably is 35 to 100 parts by weight, more preferably 35 to 80 parts by weight, most preferably 40 to 60 parts by weight per 100 parts by weight of (component (A)+component (B)+component (C)). If the amount of the organic polyisocyanate (D) used is less than 35 parts by weight, the molecular weight of the emulsion will be decreased, resulting in a decrease in the strength of the resultant film. On the contrary, if the amount of the organic polyisocyanate (D) used is more than 100 parts by weight, the remaining isocyanate groups will react with water to undergo changes with time such as an increase in viscosity during storage. Neither of the above-mentioned amounts are desirable.

Neutralizing Agent (E)

Examples of a neutralizing agent (E) include: organic amines such as ammonia, ethylamine, trimethylamine, triethylamine, triisopropylamine, tributylamine, triethanolamine, N-methyldiethanolamine, N-phenyldiethanolamine, monoethanolamine, dimethylethanolamine, diethylethanolamine, morpholine, N-methylmorpholine, and 2-amino-2-ethyl-1-propanol; alkali metals such as lithium, potassium, and sodium; and inorganic alkalis such as sodium hydroxide and potassium hydroxide. The neutralizing agent (E) is preferably highly volatile so as to be easy to dissociate through heating, for improving weatherability or water resistance of the resultant film after drying, and preferable examples of the neutralizing agent include ammonia, trimethylamine, and triethylamine. Further, the neutralizing agents are used alone or in combination of two or more of them. An amount of the neutralizing agent (E) used varies according to kind and amount of the component (C) used, but the neutralizing-agent (E) is used in a molar ratio of component (C)/neutralizing agent (E) of about 1/0.5 to 1/1.5.

Urethanation reaction among the antioxidant (A), the optional compound (B), the compound (C), and the organic polyisocyanate (D) may be performed by either of the following methods of: reacting all the components at a time, by reacting the antioxidant (A) (or together with the compound (B)) with the organic polyisocyanate (D) and then with the compound (C); and reacting the compound (C) and the organic polyisocyanate (D) and then with the antioxidant (A) (or together with the compound (B)).

The reaction is carried out in the presence of an organic solvent having a relatively low boiling point, such as toluene, xylene, methyl ethyl ketone, methyl isobutyl ketone, or acetone, under the conditions of a temperature usually not higher than the boiling point of the solvent used, specifically from 20° C. to the boiling point of the solvent, preferably from a temperature of 10° C. below the boiling point of the solvent to the boiling point of the solvent and a reaction time of 1 to 24 hours, preferably 3 to 12 hours, while monitoring residual concentration of the organic polyisocyanate (D) by gas chromatography or the like. The organic solvent having a relatively low boiling point is used because it can be readily removed by evaporation after the emulsification.

The obtained resin solution containing the reaction product is neutralized with the above-mentioned neutralizer (E) and optionally dispersed in water with an emulsifier such as dodecylbenzenesulfonic acid or polyoxyethylene nonyl phenyl ether to form an emulsion (emulsion of resin having the function of oxidation inhibition). Further, removal of the organic solvent by, for example, use of an evaporator, distillation under reduced pressure or the like after the emulsification will give rise to an aqueous emulsion of resin having the function of oxidation inhibition containing substantially no organic solvent.

Further, a resin having the function of oxidation inhibition can be obtained from this by drying the resin. The obtained emulsion of resin having the function of oxidation inhibition or aqueous emulsion of the resin having the function of oxidation inhibition may be used as one containing solids in a concentration of 5 to 60% by weight, preferably 20 to 50% by weight, more preferably 30 to 45% by weight. A concentration of solids which is less than 5% by weight is not preferable because it is difficult to form resin films having excellent properties. On the contrary, aconcentration of solids which is above 60% by weight is not preferable because the emulsion or aqueous emulsion becomes excessively high in viscosity, giving an adverse effect on the workability of coating.

As described above, the present invention includes resins having the function of oxidation inhibition obtained by urethanation reaction of the component (A), the optional component (B), the component (C), and the component (D). Among them, the resin having the function of oxidation inhibition containing a component represented by the formula (1) as the component (A) is particularly preferable.

The above resin having the function of oxidation inhibition containing substantially no organic solvent or water can impart various thermoplastic resins and thermosetting resins with an excellent antioxidant function when added thereto as a high molecular weight type resin additive. In this case, the form of the resin having the function of oxidation inhibition is not particularly limited and examples thereof may include pellets, granules, powders and so forth.

In the present invention, carboxyl groups as hydrophilic groups are introduced into the molecule of the resin urethanated as described above in order to impart water dispersibility. If necessary, anionic polar groups other than a carboxyl group, such as a sulfonic acid group and a phosphoric acid group, cationic polar groups such as a quaternary ammonium salt, nonionic polar groups such as an ether group may be introduced to the urethanated resin.

Other Resin Emulsions

A wide variety of known emulsions of resin may be used without particular limitation as other emulsions of resin which constitute the resin emulsion composition or resin aqueous emulsion composition of the present. However, in consideration of ease of addition of the emulsion of the resin having the function of oxidation inhibition, emulsions of thermoplastic resins are preferably used. Examples of the thermoplastic resin to be emulsified include polyvinyl chlorides, polyvinylidene chlorides, polyolefins, polycarbonates, polystyrenes, acrylic resins, methacrylic resins, polyamides, polyesters, acrylonitrile-butadiene-styrene (ABS) resins, polyurethane resins, vinyl chloride-vinylidene chloride-acrylonitrile copolymers, acrylonitrile-styrene (AS) resins, vinyl acetate resins, polyphenylene ethers, polysulfones, polyethersulfones, polyether ether ketones, and liquid crystal plastics. Among these, for example, polyvinyl chlorides, polyvinylidene chlorides, polyolefins, polycarbonates, polystyrenes, acrylic resins, methacrylic resins, polyamides, polyesters, ABS resins, polyurethane resins and so forth are preferably used. Further, particularly preferred among these are, those thermoplastic resins having poor alkali resistance such as polyvinyl chlorides, polyvinylidene chlorides, polycarbonates, polyesters, and polyurethane resins and those thermoplastic resins having poor solvent resistance such as polyamides. In the present invention, emulsions of these resins each may be used alone or two or more of them may be used as mixtures. Commercially available emulsions may be used as the emulsions of these resins.

Note that when preparing resin emulsion compositions consisting of other resin emulsions and the emulsions of the resins having the function of oxidation inhibition, the other resin emulsions may be either organic solvent emulsions or aqueous emulsions. On the other hand, when preparing resin aqueous emulsion compositions consisting of other resin emulsions and the aqueous emulsions of the resins having the function of oxidation inhibition, the other resin emulsions are preferably aqueous emulsions of the other resins.

The blending ratio between the other resin emulsion and the emulsion of the resin having the function of oxidation inhibition that constitutes the resin emulsion composition or the resin aqueous emulsion composition of the present invention is not particularly limited and may be selected appropriately within a wide range. Preferably, the other resin and the resin having the function of oxidation inhibition are blended with each other such that a ratio between the other resin and the resin having the function of oxidation inhibition (solids content) is (80 to 99.995)/(20 to 0.005), more preferably (90 to 99.9)/(10 to 0.1) (the sum of both the components is 100).

The emulsion of the resin having the function of oxidation inhibition, aqueous emulsion of the resin having the function of oxidation inhibition, resin emulsion composition and resin aqueous emulsion composition containing those emulsions of the present invention may have blended therewith, if necessary, at least one of known additives selected from an ultraviolet absorbent, a light stabilizer, a processing stabilizer, a rubber antioxidant, and a compatibilizing agent.

Examples of the ultraviolet absorbent include 2-(2-hydroxy-3,5-bis(α,α-dimethylbenzyl)phenyl)-2H-benzotriazole and 2-(3,5-di-t-amyl-2-hydroxyphenyl)benzotriazole. Examples of the light stabilizer include hindered amine light stabilizers such as (2,2,6,6-tetramethyl-4-piperidyl)sebacate and nickel salt light stabilizers such as nickel dibutyldithiocarbamate.

Examples of the processing stabilizer include phosphorus processing stabilizers such as tris(2,4-di-tert-butylphenyl) phosphate.

Examples of the rubber antioxidant include 1,1-bis(4-hydroxyphenyl)cyclohexene, and N,N'-diphenyl-p-phenylenediamine.

The blending amount of these additives is not particularly limited; usually it is preferable that the additives are used in amounts of 0.01 to 20% by weight based on the content of the resin having the function of oxidation inhibition.

The emulsion of the resin having the function of oxidation inhibition, the resin emulsion composition, the aqueous emulsion of the resin having the function of oxidation inhibition, and the resin aqueous emulsion composition of the present invention may be used for all the applications for which aqueous emulsions of resins are used, and particularly preferably used for applications in which they may be exposed to sunlight or light containing ultraviolet rays and heat. Specific examples of such applications include: glass substitutes and surface coating materials thereof; coating materials for window glass, lighting window glass and light source protecting glass of dwelling houses, facilities, transporting equipment, and so forth; covering materials and coating compositions for interior and exterior of dwelling houses, facilities, transporting equipment, and so forth; components of light sources that emit ultraviolet rays, such as a fluorescent light and a mercury lamp; shielding materials for shielding electromagnetic waves and the like generated by precision machines, components of electronic and electrical appliances, and various displays; containers or packaging materials for foods, chemicals, drugs; sheet or film materials for agricultural or industrial uses; anti-fading agents for prints, dyed products, dyes and pigments, and so forth; cosmetics such as sunscreen creams, shampoo, rinse, and hair dressing; textiles and textile products for clothing such as sport ware, stockings, and hats; domestic interior materials such as fibers, curtains, carpets, and wallpapers; medical instruments such as plastic lenses, contact lenses, and prosthetic eyes; optical goods such as optical filters, prisms, mirrors, and photographic materials; stationery such as tapes and inks; notice boards, indicators, and the like, and surface coating materials and the like therefor.

EXAMPLES

Hereinafter, the present invention will be described in detail by examples. However, the present invention should not be considered to be limited by these examples.

Example 1

In a glass made flask equipped with a condenser tube, a nitrogen introduction tube, a dropping funnel, a thermometer, and a stirrer were charged 163.78 parts by weight of acetone and 263.18 g of isophorone diisocyanate, and while stirring in a nitrogen atmosphere, 343.74 parts by weight of the antioxidant (A) represented by the formula (2) [CHINOX528 (manufactured by CHITEC CEMICAL)] was dripped to the resultant. The temperature of the flask was elevated to 65° C. and the reaction was performed for 2 hours. Then, 48.19 parts by weight of dimethylolbutanoic acid (DMBA) was charged and farther 0.30 parts by weight of dibutyltin dilaurate was charged, and the reaction was continued for additional 10 hours to synthesize a prepolymer. The NCO concentration at the time when the reaction was completed was 0.492 mmol/g (theoretical NCO concentration: 0.484 mmol/g) and the prepolymer had a number average molecular weight of 4,000 and a weight average molecular weight of 8,000 by gel permeation chromatography.

Then, 28.65 parts by weight of dimethylaminoethanol was added to neutralize carboxyl groups. An acetone solution of the prepolymer after the neutralization was dripped in 1,600 parts by weight of water while stirring to emulsify the prepolymer. Thereafter, the solvent, acetone, was removed under reduced pressure to obtain the target aqueous emulsion of resin (A-1) having the function of oxidation inhibition. The aqueous emulsion of resin having the function of oxidation inhibition had a nonvolatile content concentration of 40% by weight and an average particle diameter of 75 nm as measured by using a light scattering type particle diameter measuring apparatus (ELS-800, manufactured by Otsuka Electronic).

Example 2

In a glass made flask equipped with a condenser tube, a nitrogen introduction tube, a dropping funnel, a thermometer, and a stirrer were charged 163.78 parts by weight of acetone and 264.41 g of isophorone diisocyanate, and while stirring in a nitrogen atmosphere, 347.41 parts by weight of the above-mentioned antioxidant [CHINOX528] was dripped to the resultant. The temperature of the flask was elevated to 65° C. and the reaction was performed for 2 hours. Then, 43.30 parts by weight of dimethylolpropionic acid (DMPA) was charged and farther 0.30 parts by weight of dibutyltin dilaurate was charged, and the reaction was continued for additional 10 hours to synthesize a prepolymer. The NCO concentration at the time when the reaction was completed was 0.495 mmol/g (theoretical NCO concentration: 0.484 mmol/g) and the prepolymer had a number average molecular weight of 4,000 and a weight average molecular weight of 8,000 by gel permeation chromatography.

Then, 28.65 parts by weight of dimethylaminoethanol was added to neutralize carboxyl groups. An acetone solution of the prepolymer after the neutralization was dripped in 1,600 parts by weight of water while stirring to emulsify the prepolymer. Thereafter, the solvent, acetone, was removed under reduced pressure to obtain the target aqueous emulsion of resin (A-2) having the function of oxidation inhibition. The aqueous emulsion of resin having the function of oxidation inhibition had a nonvolatile content concentration of 40% by weight and an average particle diameter of 70 nm as measured by using the above-mentioned light scattering type particle diameter measuring apparatus.

Example 3, Example 4, and Comparative Example 1 and Comparative Example 2

The followings were added in ratios (solids content) as shown in Table 1 to 100 parts by weight of solids content of polyurethane aqueous emulsion Neorez R-960 (manufactured by Avecia KK, nonvolatile content concentration: 40% by weight): the aqueous emulsion of resin having the function of oxidation inhibition obtained in Example 1 given above (Example 3); the aqueous emulsion of resin having the function of oxidation inhibition obtained in Example 2 given above (nonvolatile content concentration: 40% by weight) (Example 4); conventional antioxidant (2,6-di-t-butyl-4-methylphenol) (Comparative Example 1); and forcedly emulsified emulsion of n-octadecyl-3-(3,5-di-t-butyl-4-hydroxyphenyl) propionate with PVA dispersant (solids content: 40%, Tominox SS, manufactured by Yoshitomi Fine Chemicals, Ltd.) (Comparative Example 2). The resultant blends were each cast on a Teflon-coated glass plate to obtain a film thickness of 100 μm after drying and cured and dried at room temperature for 14 days to obtain films.

The blend preparations were left to stand for 7 days and the stability of the blend liquids was examined.
Stable: ○
Separation observed: Δ and
Sedimentation observed: x The films were subjected to exposure tests in a sunshine weather meter and tensile strength tests after exposure for 1,000 hours were performed to examine tensile elongation at break of each film. The test conditions are as shown below.
(1) Machine used for exposure tests: Due cycle sunshine weather meter WEL-SUN-DC, manufactured by Suga Test Machine Co., Ltd., light source: carbon arc, rainfall cycle: 18 minutes rainfall for every 120 minutes, temperature: black panel 80° C.
(2) Machine used for tensile strength tests: Shimadzu Autograph DSC, manufactured by Shimadzu Corporation, conditions: 200 kg/FS, crosshead speed 50 mm/minute, GL=30 mm.

The results of the tests are shown in Table 1.

TABLE 1

| | Addition amount | Blending stability | Initial (%) | After 1,000 hours (%) |
|---|---|---|---|---|
| Example 3 | 3 | ○ | 198 | 196 |
| Example 4 | 3 | ○ | 200 | 198 |
| Comparative Example 1 | 3 | x | 168 | 101 |
| Comparative Example 2 | 3 | Δ | 190 | 170 |
| | 0 | — | 206 | 18 |

Table 1 indicates that the preparation of the present invention has superior light resistance (function of oxidation inhibition) to the conventional preparation. Note that the non-polyurethanated preparation showed poor blending stability and so that evaluation could not be performed in the same manner as in the case of the polyurethanated preparation.

INDUSTRIAL APPLICABILITY

According to the present invention, aqueous emulsions of resin having the function of oxidation inhibition and so forth having light resistance that is at a high level and is stable for a long period of time can be provided.

What is claimed is:
1. An emulsion of a resin having a function of oxidation inhibition obtained by subjecting an antioxidant (A) having two or more alcoholic hydroxyl groups, an optional polyol compound (B), a compound (C) having a carboxyl group and an active hydrogen group, and an organic polyisocyan- ate (D) to urethanation reaction in an organic solvent to obtain a resin solution, neutralizing the resin solution with a neutralizing agent (B), and then dispersing the resin solution in water, wherein the antioxidant (A) having two or more alcoholic hydroxyl groups is represented by general formula (1)

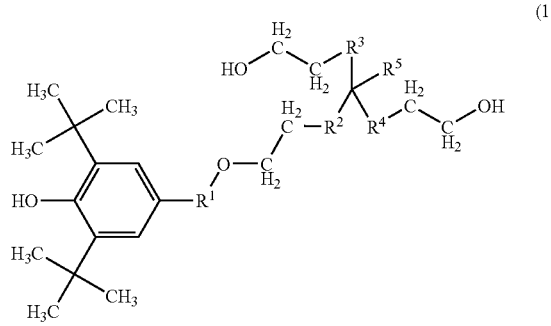

(1)

(wherein $R^1$ is an alkylene group having 1 to 10 carbon atoms and/or —$(CH_2—CO)_m$—, $R^2$, $R^3$, and $R^4$ each are an alkylene group having 1 to 10 carbon atoms and/or —$(CH_2—O)_n$—, $R^5$ is an alkyl group having 1 to 10 carbon atoms or a hydrogen atom, and m and n each are an integer of 1 to 10).

2. The emulsion of the resin having the function of oxidation inhibition according to claim 1, wherein a structural unit of the antioxidant (A) having two or more alcoholic hydroxyl groups is contained in a resin in an amount of 10% by weight or more.

3. The emulsion of the resin having the function of oxidation inhibition according to claim 1, wherein the compound (C) having a carboxyl group and an active hydrogen group is at least one selected from the group consisting of dimethyloipropionic acid, dimethylolbutanoic acid, a reaction product between polyamine and acid anhydride, and a lactone adduct obtained by using dimethylolpropionic acid or dimethylolbutanoic acid as an initiator.

4. A resin emulsion composition comprising another resin emulsion, and the emulsion of the resin having the function of oxidation inhibition according to claim 1.

5. An aqueous emulsion of a resin having a function of oxidation inhibition obtained by removing the organic solvent from the emulsion of the resin having the function of oxidation inhibition according to claim 1.

6. A resin aqueous emulsion composition comprising an aqueous emulsion of another resin and the aqueous emulsion of the resin having the function of oxidation inhibition according to claim 5.

7. A resin having a function of oxidation inhibition obtained by subjecting an antioxidant (A) having two or more hydroxyl groups, an optional polyol compound (B), a compound (C) having a carboxyl group and an active hydrogen group, and an organic polyisocyanate (D) to urethanation reaction, wherein the antioxidant (A) having two or more alcoholic hydroxyl groups is represented by general formula (1)

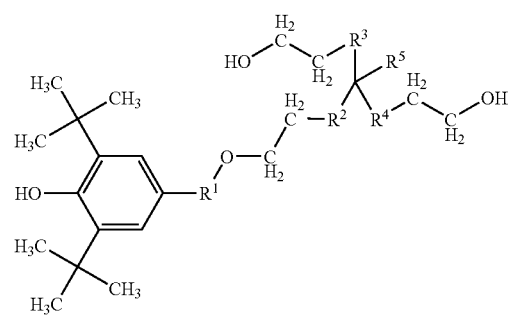

(1)

(wherein $R^1$ is an alkylene group having 1 to 10 carbon atoms and/or —$(CH_2—CO)_m$—, $R^2$, $R^3$, and $R^4$ each are an alkylene group having 1 to 10 carbon atoms and/or —$(CH_2—O)_n$—, $R^5$ is an alkyl group having 1 to 10 carbon atoms or a hydrogen atom, m and n each are an integer of 1 to 10).

* * * * *

UNITED STATES PATENT AND TRADEMARK OFFICE
CERTIFICATE OF CORRECTION

PATENT NO. : 7,169,844 B2
APPLICATION NO. : 10/502227
DATED : January 30, 2007
INVENTOR(S) : Kiyotaka Inokami It is certified that error appears in the above-identified patent and that said Letters Patent is hereby corrected as shown below:

Col. 11, Claim 1 line 3 reads "neutralizing agent (B)" should read -- neutralizing agent (E)--

Col. 11, Claim 3 line 39 reads "dimethyloipropionic acid" should read --dimethylolpropionic acid--

Signed and Sealed this

Twenty-ninth Day of May, 2007

JON W. DUDAS
*Director of the United States Patent and Trademark Office*